June 11, 1940.
J. B. SHERMAN
2,203,750
MEASURING SYSTEM
Filed Aug. 31, 1937
2 Sheets-Sheet 1
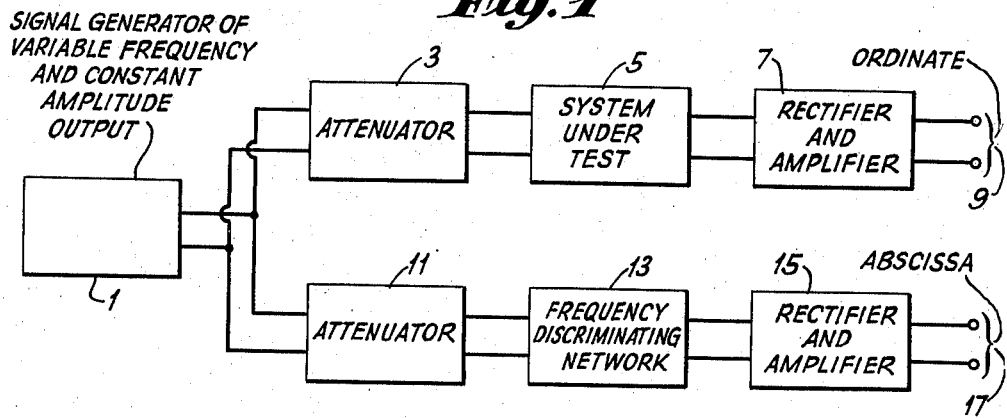
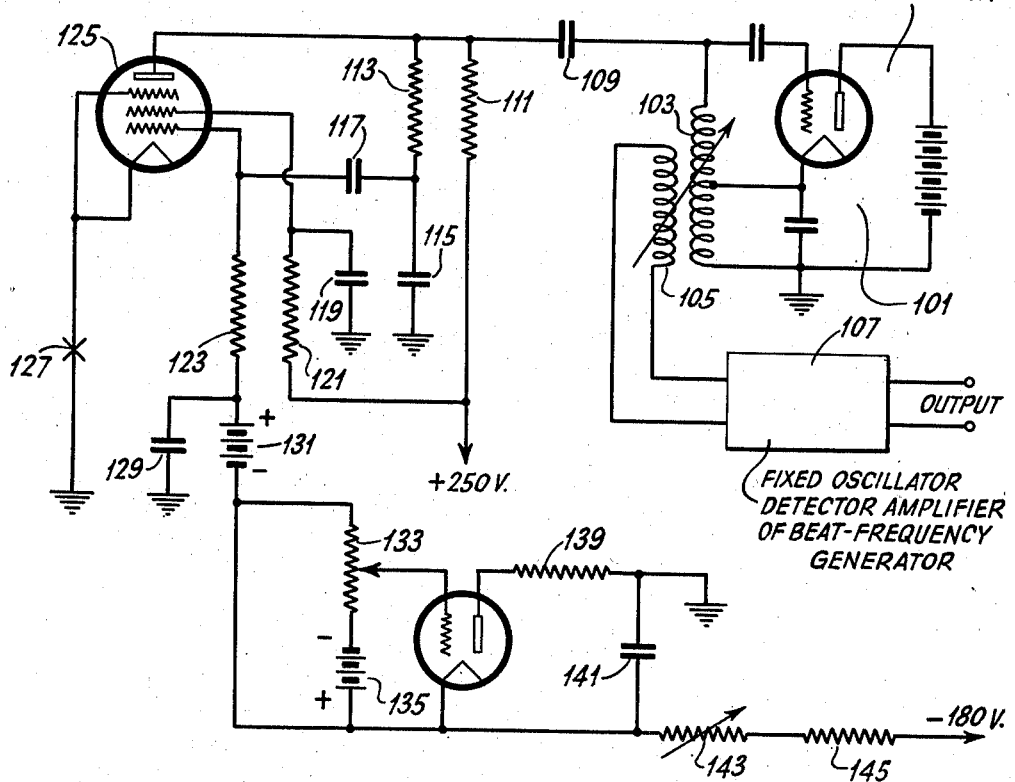
INVENTOR.
JESSE B. SHERMAN
BY
ATTORNEY.

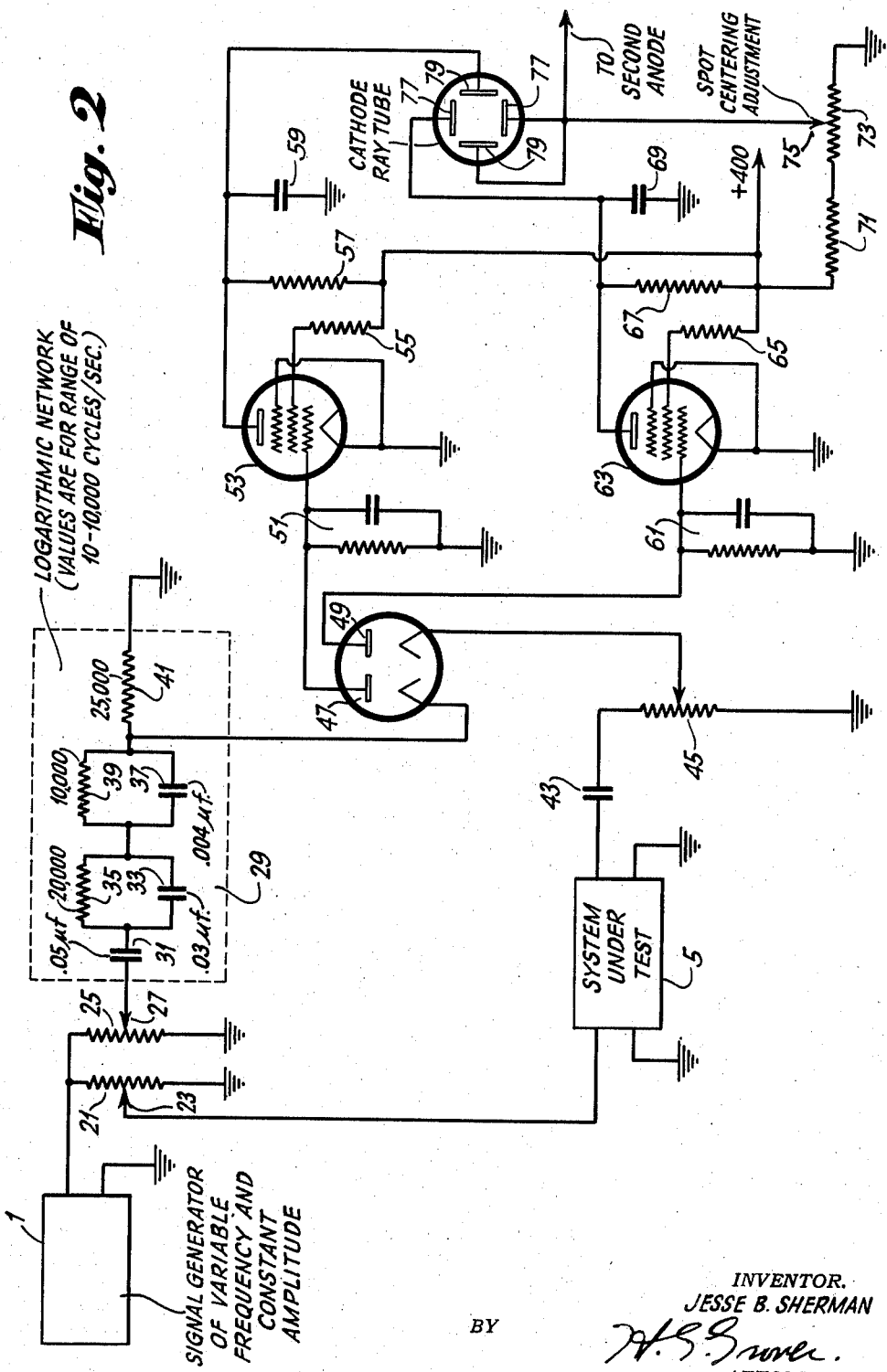

Patented June 11, 1940

2,203,750

UNITED STATES PATENT OFFICE 2,203,750

MEASURING SYSTEM

Jesse B. Sherman, New York, N. Y., assignor to Radio Corporation of America, a corporation of Delaware Application August 31, 1937, Serial No. 161,795

3 Claims. (Cl. 175—183)

This invention relates to measuring systems and in particular to the method and means for rapidly determining the amplitude-frequency characteristic of electrical networks, as well as vibrating or oscillatory mechanical systems.

It is generally necessary in the study of mechanical and electrical vibrating systems to know the relationship between the amplitude of one or more of the parameters of the system as a function of frequency of applied driving force and to show this relationship visually in graphic form with the ordinate values representing the amplitude and the abscissae representing the values of frequency. In the measuring systems of the prior art, the apparatus and method of obtaining such characteristics were quite complicated and required more or less elaborate set-ups of an expensive nature.

It is accordingly, one of the objects of my invention to provide new method and means for readily obtaining amplitude-frequency characteristics of systems.

Another object of my invention is to provide a new and novel method and means for automatically showing in graphic form the amplitude-frequency characteristic of a system rapidly with comparatively simple and stable apparatus.

A further object of my invention is to provide a measuring system embodying a two dimensional curve tracing device in combination with a frequency discriminating network to furnish the frequency coordinate of the amplitude-frequency characteristic graph.

Yet another object of my invention is to provide an amplitude-frequency characteristic measuring system in which a single source of variable frequency energy is used simultaneously to determine the amplitude response of a system under test and to furnish the frequency co-ordinate in an automatic two-dimensional curve tracing device to which is also supplied the amplitude co-ordinate.

Still another object of my invention is to provide an oscillator of variable frequency output whose frequency is varied cyclically by electronic means and suitable for use with my new measuring method and system.

Other objects and features of my invention will become clear upon reading the following detailed description together with the drawings.

In the drawings,

Fig. 1 shows in simple block diagram form the underlying method and apparatus of my invention;

Fig. 2 shows schematically in more detail one embodiment of my invention; and

Fig. 3 shows a detailed schematic diagram of my improved cyclically varied variable frequency oscillator for use in the new measuring system such as shown in Fig. 2.

Referring now to Fig. 1, I will describe my invention generally and then in more detail.

In Fig. 1 I have shown in block diagram form a signal generator 1 of variable frequency and constant amplitude output. The output of the signal generator is fed in parallel relationship to two attenuators 3 and 11 and the outputs of each of the attenuators fed in one case to the system under test 5 whose amplitude-frequency characteristic is desired. The output of the system under test is then fed to the combined rectifier and amplifier 7, the output of which in turn is made available at a pair of terminals 9 which may then be connected to any suitable recording instrument to provide the ordinate of the amplitude-frequency characteristic curve. The output of the attenuator 11 is fed sequentially to a frequency discriminating network 13, a rectifier and amplifier 15, and to the terminals 17, which terminals may then be connected to the same recording instrument to provide the abscissa of the amplitude-frequency characteristic curve.

The attenuators 3 and 11 are used both to control the amplitudes of the variable frequency fed both to the system under test 5 and the frequency discriminating network 13 and also to isolate any reaction from both the elements 5 and 13 upon the signal generator 1. The frequency discriminating network is an electrical network whose constants are so chosen as to exhibit a predetermined amplitude output as a function of frequency. Generally the constants are so chosen that the output of the network varies logarithmically with frequency. That is to say that the amplitude of the output of the frequency discriminating network 13 varies as the logarithm of the frequency of the input voltage which is held at constant amplitude. Considerable latitude in the choice of constants to provide the logarithmic relationship between input and output of the frequency discriminating network is available and is entirely within the control of the designer of the network.

Other frequency discriminating networks, of course, can be used. For example, if it is desired to use a network to provide a linear relationship between amplitude and frequency, then a condenser whose impedance is large over the desired frequency range is connected in series with a resistor whose resistance is small, and the potential drop across the resistor is utilized, then the potential difference across the resistor will be substantially linear with frequency. This results from the fact that the impedance of the condenser varies inversely with frequency, and accordingly, for a voltage of constant amplitude but variable frequency impressed across the series combination of the condenser and resistor, there will appear flowing through the resistor a current which is substantially proportional to the frequency. Since the potential difference is equal to the product of the current and the resistance, this potential difference must, consequently, be substantially proportional to frequency.

Other types of characteristics for the frequency discriminating network can be used. However, in what follows, a logarithmic type characteristic will be discussed since the logarithmic abscissa is the type generally used in the arts where an amplitude is plotted against frequency.

Turning now to Fig. 2, I will describe in somewhat more detail my method and apparatus for obtaining the amplitude frequency characteristic of systems.

In this figure, the signal generator 1 of constant amplitude and variable frequency is fed to the two attenuators 21 and 25. Variable taps 23 and 27 are provided for controlling the initial amplitude of the voltage which is fed to the system under test 5 and the frequency discriminating network 29. The frequency discriminating network 29 is of the type to provide a logarithmic output and constitutes a condenser 31 in series with two parallel combinations of condensers and resistors 33, 35, 37, 39 and also in series with the resistor 41. The constants shown in the drawings are so chosen as to give substantially a logarithmic output over the range of 10 to 10,000 cycles per second. It is to be understood, of course, that where a different range of frequencies is desired, the constants of elements 31 through 41 may be appropriately changed. The potential drop across the resistor 41 is then fed through a rectifier 47 and filter network 51 comprising a parallelly connected resistor and condenser. The drop across the resistance is supplied to an amplifier tube 53 which has suitably connected elements 55, 57 and 59 for supplying potentials thereto and for filtering out undesired and disturbing potentials. The output of the amplifier which appears across the resistor 57 is then supplied to a pair of deflecting plates 79 of a cathode ray oscillograph tube and serves to deflect the ray along the abscissa of a fluorescent screen for recording purposes. One of the plates 79 is connected through a variable tap 75 to a resistor 73 for positioning the focused beam of electrons initially upon the fluorescent screen.

The output from the system under test 5 is fed through a coupling condenser 43 to a potentiometer 45 and the potentiometer is connected to a rectifier 49 and filter arrangement 61 to provide input potentials for the tube 63 in the same fashion as the combination 51 supplies input potentials to the amplifier 53. Appropriate circuit elements 65, 67, and 69 serve to actuate the tube 63 in the same fashion as the related elements of the tube 53. The output potential of the tube 63 appearing across the resistor 67 is then fed to a pair of deflecting plates 77 which are positioned perpendicular to the plate 79 for supplying the ordinate of the curve to be traced on the fluorescent screen. Thus it will be apparent that as the frequency of the signal generator is varied cyclically, for example, either manually or electronically, the output of the system 5 will deflect the ray along the y or ordinate axis, while the frequency discriminating network will produce a logarithmic deflection along the x axis or abscissa. Under the combined influence of these two deflecting fields there will be traced on the fluorescent screen the amplitude-frequency characteristic of system 5, and by use of a long persistence fluorescent screen such as is well known in the art, the curve can be made to persist for a minute or longer so that the response of the system 5 may be studied.

While the outputs of the two amplifiers 53 and 63 have been shown connected to a cathode ray tube deflecting system, it will be understood that electromagnetic deflecting coils may be connected to the outputs of 53 and 63 or instead of using a cathode ray tube, a two dimensional galvanometer such as is well known to the art may be used.

While I have shown a common ground connection for the signal generator 1 and the system under test 5, as well as the frequency discriminating network and amplifiers, it will be understood that where balanced input systems are used, instead of providing a common ground connection, a conductor may be substituted which would be connected to all points shown in Fig. 2 connected to the ground.

Referring now to Fig. 3, I have shown an improved method of electronic control of beat frequency oscillators, such as might be provided for the signal generator 1. While signal generators may be manually operated to vary the frequency thereof, I have found that it is desirable to do this automatically and for this purpose, I have invented the circuit shown in Fig. 3. In Fig. 3 I have shown the variable oscillator 101 of a beat frequency generator coupled through its inductance 103 to an inductance 105 which, in turn, is coupled to both the fixed oscillator of the beat frequency generator and the detector which detects the difference in frequencies of the variable oscillator and fixed oscillator. The output of the detector suitably filtered is then fed to an amplifier as is well known in the art, and I have shown these components in the block designated as 107. Appropriate output terminals are provided for taking out the electrical energy whose amplitude is maintained substantially constant while the frequency varies cyclically. Connected across the inductance 103 through a coupling capacity 109 is the tube 125, to which is connected resistors 111, 113, 121 and 123 for supplying appropriate operating voltages to the tube as well as coupling and bypass condensers 115, 117, 119 and 129.

Looking from the inductance 103 toward the tube 125, and its associated circuit elements, there is, in effect shunted across the inductance 103 a second inductance whose value is determined by the trans-conductance of the tube 125. This arrangement is well known in the art. That is to say, the tube 125 and its associated elements represent electrically an inductance connected across the inductance 103, which inductance varies inversely proportional to the trans-conductance of the tube 125. The control grid of the tube 125 has applied to it varying potentials and since the variation in potential on the control grid in turn varies the trans-conductance of the tube 125, an equivalent change in the inductance of the oscillator 101 is produced which varies the frequency of the oscillator. By diminishing the trans-conductance of the tube 125 by increasing negative potentials to the control grids thereof, the frequency of the oscillator is made to vary. To cyclically vary this potential automatically, I have provided a condenser 141 connected in series with resistors 143 and 145 and a source of potential. By choosing the values of resistance to be quite high, the charging current of the condenser remains substantially constant so that the potential difference which builds up across the condenser 141 is substantially linear with respect to time and it is this potential which is applied to the control grid of the tube 125. It will thus be appreciated that the voltage produced across the condenser 141 has a saw-tooth formation and that the arrangement comprises a saw-tooth oscillator. Alternatively, by utilizing the exponential character of the charge, the movement across the recording medium can be made at uniform speed.

Likewise connected across the condenser is a grid control gaseous discharge tube 137 suitably biased by a source of potential 135 and a potentiometer 133. A series resistance 139 connected between the condenser and the anode of the tube 137 serves to protect the tube from destructive discharges. This is necessary where the value of the condenser is chosen large so that the periodic charging and discharging will last over a relatively large time interval, for example, one minute. When the potential across the condenser 141 rises to a value sufficient to initiate discharge in the tube 137, the tube 137 breaks down and discharges the condenser substantially instantaneously, the discharge of the condenser being so great that insufficient potential is maintained between the cathode and anode of the tube 137 to maintain the discharge, and the discharge is extinguished, whereupon the condenser 141 immediately commences recharging. The value at which the tube 137 breaks down is determined by the position of the variable tap of the potentiometer 133, increasing negative potentials on the control grid 137 and requiring higher voltages to produce commencement of the discharge through the tube 137. Thus the periodicity of charging and discharging of the condenser 141 is determined by the bias of the tube 137 and the value of the resistors 143 and 145, together with the value of the condenser 141. By suitably choosing the values of these elements, therefore, the periodicity can be controlled over a very wide range.

For producing time periods of the order of one minute the capacity 141 may have a value of four micro-farads, while the resistors 143 and 145 may have values of 5 and 10 megohms respectively. It may be desirable to use a much lower value of capacity in order to incrase the frequency of the cyclically charging and discharging of the condenser 141 to something of the order of say fifty times per second so that the sweeping through the range of frequency may be great enough that when the oscillator is used for the signal generator 1 of Fig. 2, the resultant trace on the cathode ray tube fluorescent screen will be reepated often enough to appear to give a stationary curve which may be held on the screen as long as desired for purposes of study and measurement. Likewise this arrangement provides the opportunity of photographing with an ordinary camera the amplitude-frequency characteristic produced on the fluorescent screen since the amplitude deflection along the ordinate and the frequency deflection along the abscissa are synchronized.

Thus my electronically controlled signal generator provides a new and convenient method of testing systems of which a frequency characteristic is desired.

It is to be understood, of course, that the electronically controlled beat frequency oscillator shown in Fig. 3 and described above, may be used wherever a signal generator of constant amplitude and variable frequency is desired.

Likewise it is to be understood that it is not necessary to use a beat frequency oscillator but that the arrangement shown may be used without the use of a fixed oscillator. That is to say, it may be used with an ordinary Hartley or Colpitts oscillator. However, it is generally preferred to use it in connection with the beat frequency oscillator, since a much higher ratio of minimum to maximum frequency can be obtained for a given variation of potential on the control grid of tube 125. Where manual control of frequency is desired, it can be had by manual variation of the battery voltage 131 applied to the control grid of the tube 125 or by inserting at the point 127 a variable resistor of the order of 1 to 3 megohms.

While I have described my invention with particular reference to electrical circuits, it will be appreciated that my system and method of measuring amplitude frequency characteristics may also be used for acoustical or mechanical systems in which case as, for example, for the acoustical system, the output of the signal generator may be applied to the acoustical device and the output of the acoustical device converted into electrical energy by the medium of the microphone, for example, to provide the deflecting potentials for the ordinate of the characteristic. Or in a mechanical system the amplitude may be measured by the use of a piezo electric pressure indicator such as is well known in the art, to convert mechanical displacements into electrical potentials.

Many other modifications of this invention are, of course, possible, and therefore, I believe myself to be entitled to make and use any and all of these modifications which fall fairly within the spirit and scope of the foregoing disclosure as it is defined by the hereinafter appended claims.

Having described my invention, what I claim is:

1. A system for determining the frequency response characteristics of a device comprising means for producing a variable frequency source of energy of constant amplitude, a frequency discriminating network, means for applying the said energy to said network to produce a voltage which is a function of the frequency applied thereto, a cathode ray tube comprising an electron gun structure and horizontal and vertical deflecting means, means for applying the produced voltage to the horizontal deflecting means, means for applying the said energy to the device the frequency response of which is to be determined, means for producing a voltage in accordance with the response of the device, and means for applying said voltage to the vertical deflecting means.

2. The method of determining the frequency response characteristics of a device which comprises the steps of producing a variable frequency source of energy of constant amplitude, producing a varying voltage as a function of the variable frequency, producing a beam of electrons, causing the beam to be deflected in one plane by the varying voltage produced, applying the variable frequency to the device to be tested to produce a second voltage in accordance with the frequency response of the device, and causing the beam to be deflected in another plane by the second voltage so produced.

3. A system for determining the frequency response characteristics of a device comprising means for producing a variable frequency source of energy of constant amplitude, a frequency discriminating network including a resistance and a condenser connected in parallel, means for applying said energy to said network to produce a voltage which varies as a logarithmic function of the frequency applied thereto, a cathode ray tube comprising an electron gun structure and horizontal and vertical beam deflecting means, means for applying the produced voltage to one of the deflecting means, means for applying the said energy to the device the frequency response of which is to be determined, means for producing a voltage in accordance with the response of the device, and means for applying said voltage to the other deflecting means.

JESSE B. SHERMAN.